S. EISTERHOLD.
TWO-SPEED MECHANISM.
APPLICATION FILED APR. 9, 1918.
1,316,564.
Patented Sept. 23, 1919.
2 SHEETS—SHEET 1.
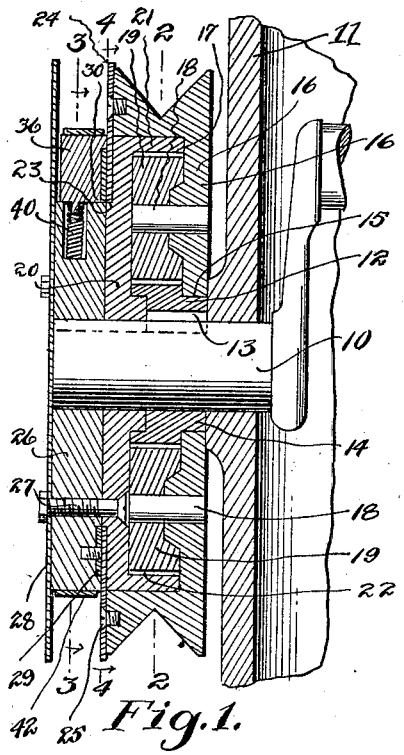
Fig. 1.
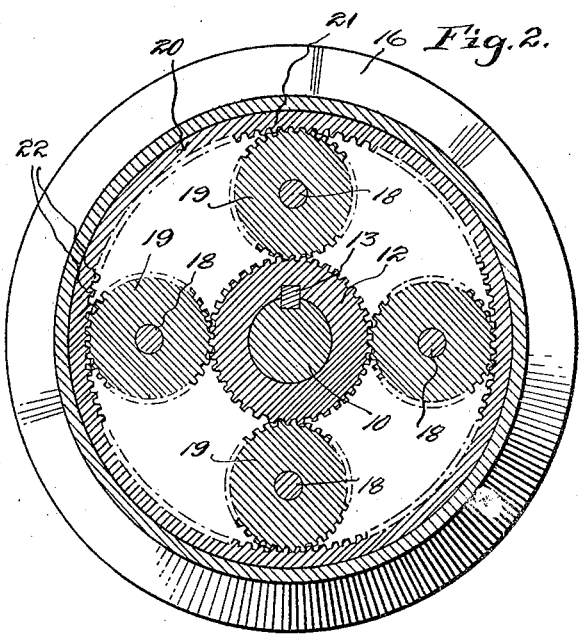
Fig. 2.
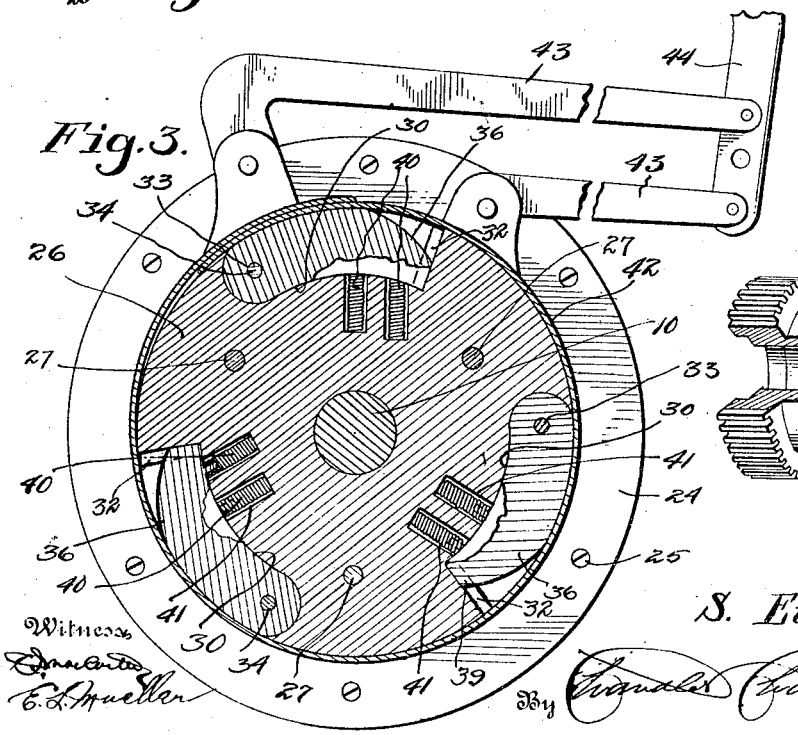
Fig. 3.
Fig. 8.
Witness
E. L. Mueller
Inventor
S. Eisterhold
By Chandler & Chandler
Attorney S. EISTERHOLD.
TWO-SPEED MECHANISM.
APPLICATION FILED APR. 9, 1918.
1,316,564.
Patented Sept. 23, 1919.
2 SHEETS—SHEET 2.
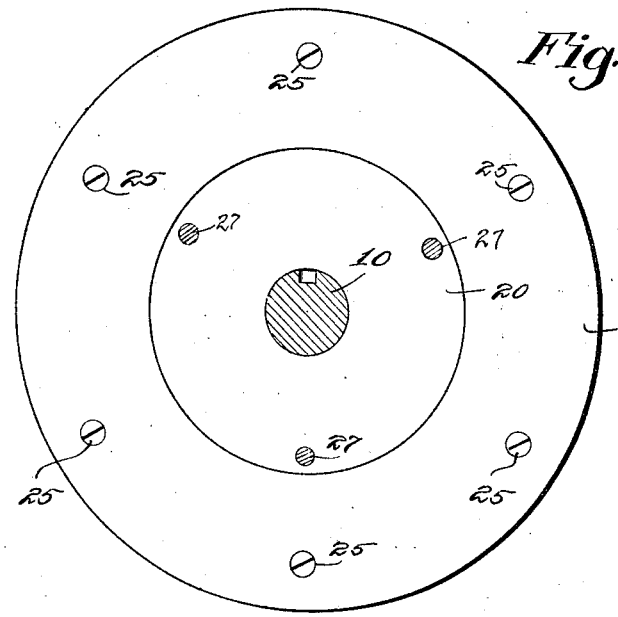
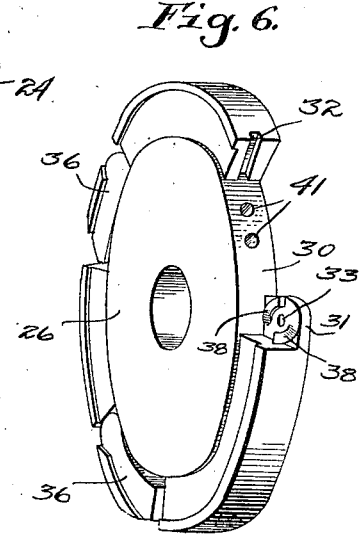
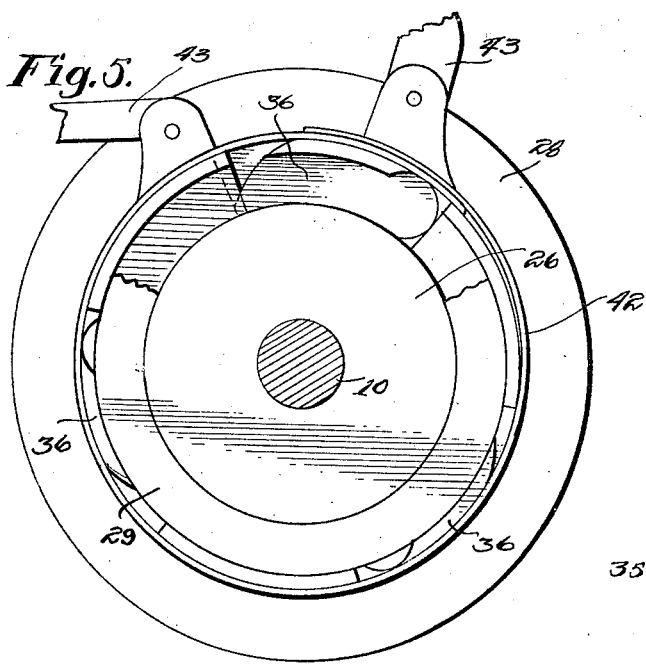
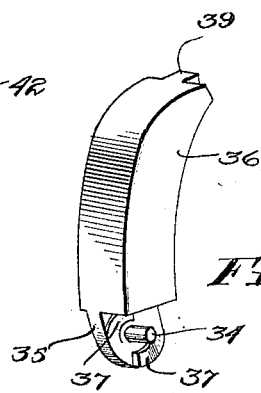
Inventor
S. Eisterhold
Attorneys

UNITED STATES PATENT OFFICE.

SEBASTIAN EISTERHOLD, OF RICH FOUNTAIN, MISSOURI.

TWO-SPEED MECHANISM.

1,316,564.　　　　Specification of Letters Patent.　　Patented Sept. 23, 1919.

Application filed April 9, 1918. Serial No. 227,509.

*To all whom it may concern:*

Be it known that I, SEBASTIAN EISTERHOLD, a citizen of the United States, residing at Rich Fountain, in the county of Osage, State of Missouri, have invented certain new and useful Improvements in Two-Speed Mechanisms; and I do hereby declare the following to be a full, clear, and exact description of the invention, such as will enable others skilled in the art to which it appertains to make and use the same.

This invention is an improvement in transmission gearing and has particular reference to a two speed mechanism adapted for use on motorcycles.

An object of the invention is to provide an improved mechanism wherein the use of shiftable gears is dispensed with when changing speed and the consequent danger of the stripping of gears thereby avoided.

Another object is the provision of a mechanism wherein a drive pulley is operated directly from the crank shaft of an engine by a train of gearing and indirectly by said gearing and clutch elements associated therewith.

A further object is to provide novel means for adjusting one of the clutch elements into and out of engagement with associated elements.

A still further object is to provide a mechanism of this character which is simple in construction, comparatively easy to manufacture and effective in carrying out the purpose for which it is designed.

The inventive idea involved is capable of receiving a variety of mechanical expressions one of which, for the purpose of illustrating the invention, is shown in the accompanying drawings wherein:—

Figure 1 is a longitudinal sectional view through the mechanism.

Fig. 2 is a section on the line 2—2 of Fig. 1.

Fig. 3 is a section on the line 3—3 of Fig. 1.

Fig. 4 is a section on the line 4—4 of Fig. 1 looking in the direction of the arrows.

Fig. 5 is a section on the same line looking in the opposite direction.

Fig. 6 is a perspective view of a drum employed in connection with the invention.

Fig. 7 is a similar view of one of the clutch shifting members carried by the drum.

Fig. 8 is a similar view of one of the gears of the train of gearing.

The invention is particularly designed for use in connection with engines employed on motorcycles but it will, of course, be understood that the same may be used on other motor driven vehicles as well. In the drawings, the numeral 10 indicates the crank shaft of an explosive engine one end of which projects through the crank case 11 and it is with this end of the shaft that the mechanism which comprises the essential feature of this invention is associated.

The mechanism preferably comprises a central gear 12 secured to the shaft 10 by means of a key 13 and has a hub portion 14 for engaging in the central opening 15 of the drive pulley 16 which is adapted to convey power from the shaft 10 to the rear wheel of the motorcycle by means of a belt or chain (not shown) that engages said pulley. The pulley 16 is provided in one face thereof with a recess 17 in which is mounted, upon the stub shafts 18, a plurality of planetary gears 19 arranged concentrically with respect to the gear 12 and engaging the same so that rotation of said gear 12 will be imparted to the gears 19 when the shaft 10 is driven. Also mounted within the recess 17 is a large internal gear 20 the flange 21 of which encircles the gears 19 and said flange is provided with the internal teeth 22 which engage the teeth of said gears 19. The gear 20 has a bearing directly upon the crank shaft 10 and is provided with an annular concentric shoulder 23 engaged by the inner periphery of a clutch ring 24 which is secured to the adjacent face of the pulley 16 by means of suitable fasteners or screws 25 and the outer periphery of said clutch member or ring extends slightly beyond that of the pulley 16 for a purpose which will appear in the course of the description.

A brake drum 26 is also rotatably mounted upon the crank shaft 10 and is secured to the gear 20 by means of bolts or other fasteners 27 which extend through said gear and drum and also through a brake band retaining plate 28 of a greater diameter than the drum and in this manner the gear 20 and drum 26 will operate in unison. Supported upon the inner side of the drum 26 and movable laterally relative thereto is a second clutch ring or member 29 adapted to be shifted in a manner to presently appear, into and out of engagement with the clutch member 24 and when in engagement therewith it will be apparent that the pulley 16 will be driven or rotated through the intermediary of the gears 19 and 20 and the drum 26 and the clutch members.

For the purpose of shifting the clutch member 29 laterally with respect to the drum and into engagement with the clutch member 24, the drum 26 is provided in a periphery with a plurality of recesses 30, preferably three in number, and one end of each recess is reduced or cut away to provide the shoulder 31 while the other end of the recess is provided with a slot or guide groove 32 arranged diagonally with respect to a plane of the drum for a purpose which will presently appear. The shoulder 31 is provided with an opening 33 for receiving the pivot stud 34 extending laterally from the reduced end 35 of a laterally movable clutch shifting member 36 of arcuate formation so as to conform substantially to the contour of the periphery of the drum when the member is in one of its adjusted positions and said reduced end 35 is provided upon its inner face with oppositely disposed cam surfaces 37 which coöperate with similar surfaces 38 formed upon the adjacent face of the shoulder 31 whereby said member 36 will be moved laterally with respect to the drum when said member is adjusted about its pivot 34. The end of the member 36 opposite the end 35 is provided with a rib 39 arranged diagonally with respect to said end engagable in the groove 32 so as to guide said member 36 in its lateral movements and also prevent accidental detachment of the member from the drum. The inner periphery of the member 36 is provided with a pair of strong coil springs 40 which engage in sockets 41 formed upon the bottom of the recess 30 and said springs normally have the tendency to force the free end of the member 36 outwardly in order that the clutch member 29 will be engaged with the member 24.

In order that the rotation of the drum 26 and positions of the members 36 may be controlled, there is preferably provided a brake band 42 encircling the periphery of the drum and members 36 and positioned between the clutch member 24 and retaining plate 28, said member and plate being adapted to prevent accidental detachment of the band from the drum and it is for the purpose that the clutch member 24 has its outer edge extending beyond the outer periphery of the pulley 16 so that said band will be prevented from engaging said pulley. The ends of the band 42 are connected to links 43 which are in turn connected to an operating lever 44 which is disposed within easy reach of the operator of the vehicle so that said lever may be adjusted to expand and contract the band 42 about the drum.

In operation, when the band 42 is tightened about the drum and members 36, the latter are forced inwardly against the tension of the springs 40 which will prevent a clutching engagement between the elements 24 and 29. When in fixed position, the drum 26 is prevented from rotating and owing to the fasteners 27, it will be apparent that the internal gear 20 will also be prevented from rotating. Thus when the crank shaft 10 is operated, the gears 12 rotating the gears 19, will cause the latter to travel planetarily within the internal gear 20 by reason of the engagement of said gears 19 with the teeth 22 and this travel of the gears 19 will carry the pulley 16 therewith thus imparting to the same a slow speed. In order to secure a second or high speed, the lever 44 is operated in the opposite direction to loosen the band 42 about the drum 26 and members 36 whereupon the latter will move outwardly under the action of the springs 40 and owing to the construction of the ends 35 of said members and the formation of the slots 32 and ribs 39, said members will also move laterally toward the gear 20 until the clutch members 24 and 29 are in clutching engagement. The loosening of the band 42 will therefore serve the dual purpose of permitting rotation of the drum 26 and imparting the movement thereof to the pulley 16 to which is secured the clutching member 24 with a consequent increased speed of said pulley.

What is claimed is:—

1. A two speed transmission comprising, in combination with a shaft, a pulley rotatable about said shaft, gearing between the pulley and shaft, a drum rotatable with respect to the pulley and to which rotation is imparted by said gearing, clutching elements associated with said pulley and drum, and means carried by said drum and operable to adjust one of the clutching elements into engagement with the other whereby to rotate said pulley with the drum at a certain speed.

2. A two speed transmission comprising, in combination with a shaft, a pulley rotatable about said shaft, gearing between the pulley and shaft, a drum rotatable with respect to the pulley and to which rotation is imparted by said gearing, clutching elements associated with said pulley and drum, means carried by said drum and operable to adjust one of the clutching elements into engagement with the other whereby to rotate said pulley with the drum at a certain speed, and braking means associated with said drum for throwing said clutching elements out of operative engagement and stopping rotation of said drum and a portion of said gearing whereby the other portion thereof and said pulley will rotate relative to the first named portion to produce a second speed.

3. A two speed transmission comprising, in combination with a shaft, a pulley rotatable about said shaft, gearing between the pulley and shaft, a drum rotatable with respect to the pulley and to which rotation is imparted by said gearing, clutching elements associated with said pulley and drum, and spring controlled members pivoted to said drum and operable to adjust said clutching elements into engagement with each other whereby to rotate said pulley with the drum at a certain speed.

4. A two speed transmission comprising, in combination with a shaft, a pulley rotatable about said shaft, gearing between the pulley and shaft, a drum rotatable with respect to the pulley and to which rotation is imparted by said gearing, clutching elements associated with said pulley and drum, spring controlled members pivoted to said drum and operable to adjust said clutching elements into engagement with each other whereby to rotate said pulley with the drum at a certain speed, and braking means associated with said drum for throwing the clutching elements out of operative engagement and stopping rotation of said drum and a portion of said gearing whereby the other portion thereof and said pulley will rotate relative to the first named portion to produce a second speed.

5. A two speed transmission comprising, in combination with a shaft, a pulley rotatable about said shaft, gearing between the pulley and shaft, a drum to which rotation is imparted by said gearing, clutching elements associated with the pulley and drum, and means pivoted to said drum and movable laterally with respect thereto for adjusting said clutching elements into engagement whereby to rotate the pulley at a certain speed.

6. A two speed transmission comprising, in combination with a shaft, a pulley rotatable about said shaft, gearing between the pulley and shaft, a drum to which rotation is imparted by said gearing, clutching elements associated with the pulley and drum, means pivoted to said drum and movable laterally with respect thereto for adjusting said clutching elements into engagement whereby to rotate the pulley at a certain speed, and means for adjusting the last named means to render said clutching elements inoperative and also stop the rotation of said drum and one of the gears of said gearing whereby the remaining gears and said pulley will rotate relative to the first named gear.

7. A two speed transmission comprising, in combination with a shaft, a pulley rotatable about said shaft, a central gear secured to said shaft, a plurality of planetary gears rotatably supported by said pulley and engaging the central gear, and internal toothed gear engaging said planetary gears, a drum secured to and rotatable with said internal gear, clutching elements associated with pulley and drum, and means carried by said drum and operable to adjust one of the clutching elements into engagement with the other whereby to rotate said pulley at a certain speed.

8. A two speed transmission comprising, in combination with a shaft, a pulley rotatable about said shaft, a central gear secured to said shaft, a plurality of planetary gears rotatably supported by said pulley and engaging the central gear, an internal toothed gear engaging said planetary gears, a drum secured to and rotatable with said internal gear, clutching elements associated with the pulley and drum, and spring controlled members pivoted to said drum and operable to adjust said clutching elements into engagement with each other whereby to rotate said pulley at a certain speed.

9. A two speed transmission comprising, in combination with a shaft, a pulley rotatable about said shaft, a central gear secured to said shaft, a plurality of planetary gears rotatably supported by said pulley and engaging the central gear, an internal toothed gear engaging said planetary gears, a drum secured to and rotatable with said internal gear, clutching elements associated with the pulley and drum, means carried by said drum and operable to adjust one of the clutching elements into engagement with the other whereby to rotate said pulley at a certain speed, and means for adjusting the last named means to throw said clutching elements out of operative engagement and to stop rotation of said drum and said internal gear whereby the planetary gears and said pulley will rotate relative to said internal gear and thereby produce a second speed.

10. A two speed transmission comprising, in combination with a shaft, a pulley rotatable about said shaft, a central gear secured to said shaft, a plurality of planetary gears rotatably supported by said pulley and engaging the central gear, an internal toothed gear engaging said planetary gears, a drum secured to and rotatable with said internal gear, clutching elements associated with the pulley and drum, spring controlled members pivoted to said drum and operable to adjust said clutching elements into engagement with each other whereby to rotate said pulley at a certain speed, and means for adjusting said spring controlled members to throw said clutching elements out of operative engagement and stop rotation of said drum and said internal gear whereby the planetary gears and pulley will rotate relative to the internal gear to produce a second speed.

11. A two speed transmission comprising, in combination with a shaft, a pulley rotatable about said shaft, a central gear secured to said shaft, a plurality of planetary gears rotatably supported by said pulley and engaging the central gear, an internal toothed gear engaging said planetary gears, a drum secured to and rotatable with said internal gear, clutching elements associated with the pulley and drum, and means pivoted to said drum and movable laterally with respect thereto for adjusting said clutching elements into engagement with respect to each other whereby to rotate said pulley at a certain speed.

12. A two speed transmission comprising, in combination with a shaft, a pulley rotatable about said shaft, gearing between the pulley and shaft, a drum to which rotation is imparted by said gearing, clutching elements associated with said pulley and drum, means carried by said drum and operable to adjust one of the clutching elements into engagement with the other whereby to rotate said pulley at a certain speed, and a brake band engaging the periphery of said drum and the clutch element adjusting means for operation of the latter for disengagement of the clutch elements and to stop the rotation of the drum and a portion of said gearing whereby the other portion thereof and said pulley will rotate relative to the first named portion to produce a second speed.

In testimony whereof, I affix my signature, in the presence of two witnesses.

SEBASTIAN EISTERHOLD.

Witnesses:
FRANK FICK,
JOSEPH EISTERHOLD.

Copies of this patent may be obtained for five cents each, by addressing the "Commissioner of Patents, Washington, D. C."